United States Patent Office 2,776,729
Patented Jan. 8, 1957

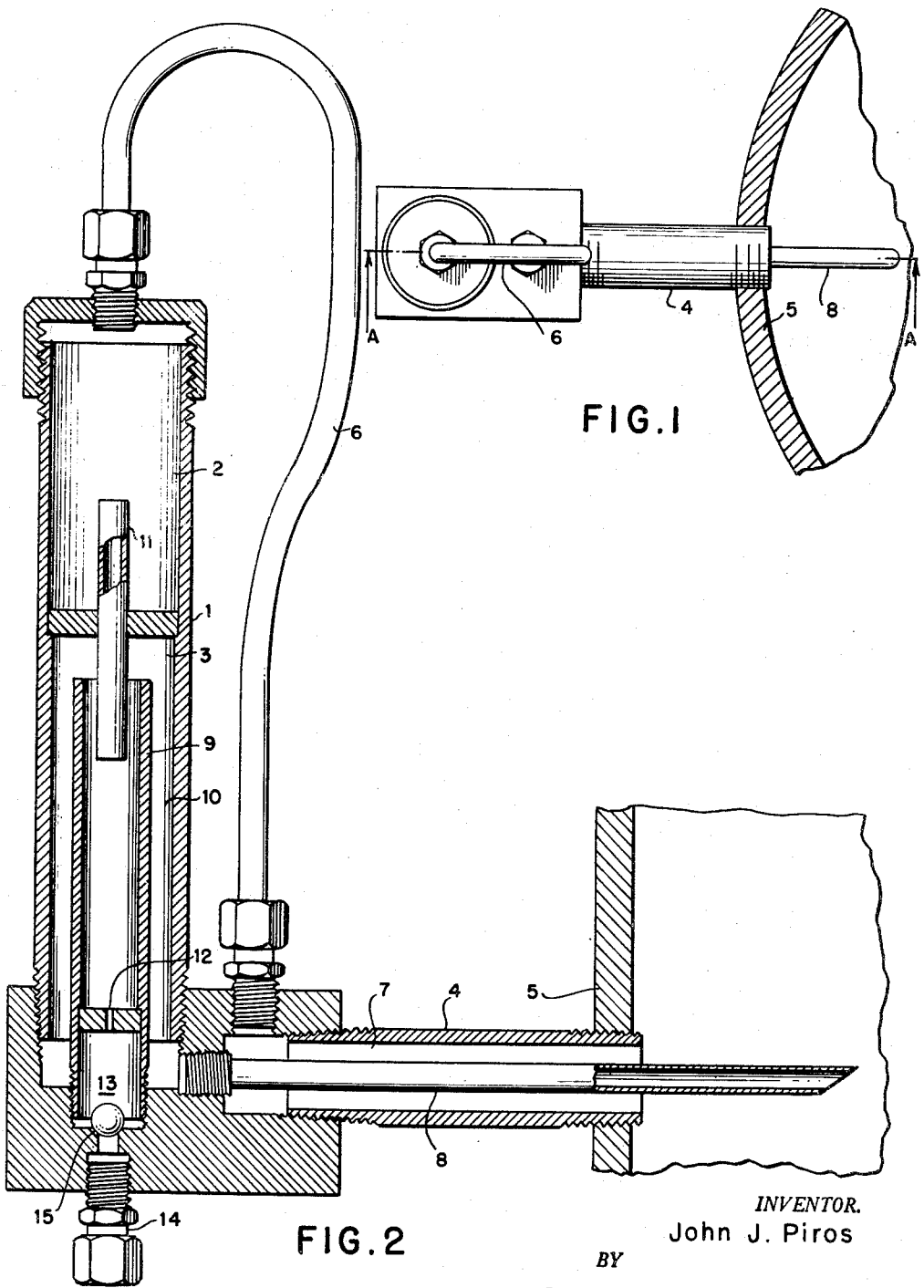

2,776,729

LUBRICATING APPARATUS

John J. Piros, Homewood, Ill., assignor to Sinclair Refining Company, New York, N. Y., a corporation of Maine Application November 30, 1953, Serial No. 395,038

1 Claim. (Cl. 184—50)

My invention relates to the lubrication of steam operated devices and in particular to a device for emulsifying lubricants for use in such steam operated devices.

In the lubrication of steam operated devices, for example, steam engine cylinders, a difficult problem is presented in providing adequate lubrication of the valves and upper cylinder walls. The use of a force feed lubrication system alone does not solve the problem since the viscous oil injected into the cylinder is not sufficiently dispersed to provide a lubricating film over the entire wear area of the cylinder wall.

I have devised an apparatus which provides good lubrication for steam operated devices, for example, a steam engine cylinder, in which the lubricant is preheated, dispersed through an orifice and emulsified with hot steam condensate before its introduction into the steam cylinder, thus providing a good lubricating film over the entire wear area of the cylinder wall. By preheating the lubricant, its viscosity is reduced before it is passed through the dispersing orifice, thus enabling the orifice to produce a finer dispersion of the lubricant in the boiling condensate. Moreover, the dispersion of the preheated lubricant through the orific produces a dispersion of droplets within the boiling condensate which affects a more intimate contact between the introduced lubricant and the boiling condensate, thereby contributing to the easy formation of a good lubricant emulsion.

The lubricating device of my invention comprises a hollow shell divided into an upper and lower chamber, an inner cylinder situated within the lower chamber and containing an orifice, a connection from the upper chamber into the inner cylinder and connections for steam introduction into the upper and lower chamber and for lubricant introduction into the inner cylinder. The inner cylinder is open at the top and closed at the bottom and is mounted within the lower chamber of the hollow shell. The inner cylinder contains an orifice situated so that a preheating chamber is defined within the inner cylinder below the orifice. The inner cylinder is of a diameter sufficiently less than that of the hollow shell so that an annular space is provided between the cylinder wall and the lower chamber wall.

In operation, a lubricant, for example, lubricating oil or grease, is introduced into the preheating chamber of the inner cylinder where it is preheated by steam present in the lower chamber of the hollow shell and its viscosity reduced. The lubricant is introduced, for example, from a force feed lubricator. The preheated lubricant is forced through the dispersing orifice into the upper part of the inner cylinder where it contacts hot steam condensate. The hot steam condensate for forming the oil emulsion is obtained from the upper chamber of the hollow shell through the connection to the inner cylinder. The condensate is kept boiling in the inner cylinder by the presence of steam in the lower chamber of the hollow shell. The finely dispersed lubricant and hot condensate contact in the inner cylinder and form a fine emulsion which overflows into the lower chamber of the hollow shell and is passed out through a tube into a steam line leading to the steam operated device or into steam chests, valves or cylinders. Thus, the device of my invention effectively provides a finely dispersed lubricant emulsion which provides good lubrication for the entire wear walls of a steam operated device, particularly a steam engine cylinder.

The device of my invention will be further ilustrated by reference to the accompanying drawing of a working embodiment of my invention in which Figure 1 is a top plan view and Figure 2 is a sectional view along the line A—A of Figure 1.

In the drawing, a hollow shell 1 is provided which is divided into an upper chamber 2 and a lower chamber 3. The device is shown as mounted on a steam line in which pipe nipple 4 is connected to steam line 5 which is connected, for example, to a steam engine cylinder. Steam to the upper chamber is provided through tube 6 from annulus 7 of the pipe nipple 4. Pipe 8 delivers the emulsified lubricant into the steam line and also admits steam into the lower chamber 3 as the pipe does not operate full of liquid. An inner cylinder 9 is situated within the lower chamber 3 and is of such a diameter that an annulus 10 is provided. A connection 11 from the upper chamber 2 into the inner cylinder 9 provides for the draining of hot steam condensate into the cylinder. An orifice 12 is provided within the inner cylinder 9 defining a lower preheating chamber 13. Lubricant, e. g. lubricating oil, is supplied to the inner cylinder 9 from a force feed lubricator through line 14 and ball check valve 15. Oil flows from the force feed lubricator into preheating chamber 13 where it is heated by steam present in the annulus 10 of the lower chamber 3 and is then dispersed through orifice 12 into the upper part of the inner cylinder 9 where it is contacted with hot steam condensate. The effect of the steam in the annulus 10 of the lower chamber 3 surrounding the open cylinder 9 causes the hot condensate and the dispersed oil to form a fine emulsion which overflows from the inner cylinder 9 and passes out of the lower chamber 3 along with additional steam condensed by the wall of the lower chamber 3. The emulsified oil then flows through pipe 8 into the steam line 5 to the steam engine cylinder.

I claim:

A lubricating device for steam operated devices which comprises a hollow shell divided into an upper chamber and a lower chamber, an inner cylinder which is open at the top mounted within the lower chamber and forming an annulus between the lower chamber and inner cylinder, check valve means situated in the lower portion of said inner cylinder, means below the check valve means for connecting the inner cylinder to a lubricant source, a retricted orifice within the inner cylinder and spaced above said check valve means, connecting means from the upper chamber into the inner cylinder in the lower chamber, means for introducing steam into the upper chamber, means for introducing steam into the lower portion of the annulus between the lower chamber and the inner cylinder, and means for removing emulsified lubricant from said annulus.

References Cited in the file of this patent

UNITED STATES PATENTS

| | | |
|---|---|---|
| 2,074,943 | Sharp | Mar. 23, 1937 |
| 2,214,242 | Blocker | Sept. 10, 1940 |
| 2,657,764 | Sharp | Nov. 3, 1953 |